United States Patent
Wang et al.

(10) Patent No.: US 12,001,512 B2
(45) Date of Patent: Jun. 4, 2024

(54) GENERATING LABELED SYNTHETIC TRAINING DATA

(71) Applicant: Mineral Earth Sciences LLC, Mountain View, CA (US)

(72) Inventors: Kangkang Wang, San Jose, CA (US); Hong Wu, Los Altos, CA (US); Bodi Yuan, Sunnyvale, CA (US); Zihao Li, San Jose, CA (US)

(73) Assignee: MINERAL EARTH SCIENCES LLC, Mountain View, CA (US)

( * ) Notice: Subject to any disclaimer, the term of this patent is extended or adjusted under 35 U.S.C. 154(b) by 469 days.

(21) Appl. No.: 17/329,528

(22) Filed: May 25, 2021

(65) Prior Publication Data

US 2022/0383042 A1   Dec. 1, 2022

(51) Int. Cl.
*G06F 18/21* (2023.01)
*G06F 18/214* (2023.01)
*G06F 18/2413* (2023.01)

(52) U.S. Cl.
CPC ........ *G06F 18/214* (2023.01); *G06F 18/2413* (2023.01)

(58) Field of Classification Search
CPC .. G06F 18/214; G06F 18/2413; G06V 20/188
USPC ......................................................... 382/110
See application file for complete search history.

(56) References Cited

U.S. PATENT DOCUMENTS

| | | | |
|---|---|---|---|
| 2018/0286117 A1 | 10/2018 | Redden et al. | |
| 2019/0179982 A1 | 6/2019 | Reese et al. | |
| 2019/0377946 A1* | 12/2019 | Genty | G06V 10/82 |
| 2019/0385018 A1 | 12/2019 | Ngo Dinh et al. | |

FOREIGN PATENT DOCUMENTS

| | | | | |
|---|---|---|---|---|
| CN | 101894388 | | 11/2010 | |
| WO | 2018173622 | | 5/2020 | |
| WO | WO-2021185745 A1 * | | 9/2021 | G06N 3/045 |

OTHER PUBLICATIONS

Di Cicco, M. et al., "Automatic Model Based Dataset Generation for Fast and Accurate Crop and Weeds Detection", 2017 IEEE/RSJ International Conference on Intelligent Robots and Systems (IROS), 8 pages, dated 2017.

(Continued)

*Primary Examiner* — Neil R McLean
(74) *Attorney, Agent, or Firm* — Gray Ice Higdon

(57) ABSTRACT

Implementations are described herein for automatically labeling synthetic plant parts in synthetic training images, where the synthetic training images and corresponding labels can be used as training data for training machine learning models to detect, segment, and/or classify various parts of plants in digital images. In various implementations, a digital image may be obtained that captures an area. The synthetic training image may be generated to depict one or more three-dimensional synthetic plants in the area. In many implementations, a plant mask, identifying individual plants as a whole in the synthetic training image, as well as a part mask, uniquely identifying one or more parts of the synthetic plant models, can be overlaid on the synthetic training image to label the one or more parts of the synthetic plant models.

20 Claims, 8 Drawing Sheets

(56) References Cited

OTHER PUBLICATIONS

Asad, M. et al., "Weed Detection in Canola Fields Using Maximum Likelihood Classification and Deep Convolutional Neural Network", Information Processing in Agriculture 7.4, pp. 535-545, dated 2019.

Alhnaity, B. et al. "Using Deep Learning to Predict Plant Growth and Yield in Greenhouse Environments", International Symposium on Advanced Technologies and Management for Innovative Greenhouses: GreenSys2019 1296, 8 pages, dated 2019.

Jones, G., et al., "Crop/Weed Discrimination In Simulated Agronomic Images", Proceedings of SPIE—The International Society for Optical Engineering, 8 pages, dated 2007.

Olsen, A. et al., "Deepweeds: A Multiclass Weed Species Image Dataset for Deep Learning" Scientific Reports, 12 pages, dated 2019.

Ammie, C. et al., "Low-Power and High-Speed Deep FPGA Inference Engines for Weed Classification at the Edge", IEEE Access 7, 15 pages, dated 2019.

Liu, B. et al., "Weed Detection for Selective Spraying: a Review", Current Robotics Reports, Springer, pp. 19-26, dated Jan. 31, 2020.

Douarre, C. et al., "Novel Data Augmentation Strategies to Boost Supervised Segmentation of Plant Disease", Computers and Electronics in Agriculture, Elsevier, vol. 165, 15 pages, dated Aug. 30, 2019.

Nazki, H. et al., "Unsupervised Image Translation Using Adversarial Networks for Improved Plant Disease Recognition", Computers and Electronics in Agriculture, Elsevier, vol. 168, 14 pages, dated Dec. 20, 2019.

European Patent Office, International Search Report and Written Opinion of Application No. PCT/US2021/036087, 12 pages, dated Sep. 21, 2021.

* cited by examiner

GENERATING LABELED SYNTHETIC TRAINING DATA

BACKGROUND

Classification of plants in digital imagery has numerous applications. One particularly useful application is detection, classification, and/or segmentation of targeted types of plants, such as crops, weeds, etc. Various types of machine learning models can be trained to segment and/or recognize various types of plants in digital images. Convolutional neural networks are one popular example. However, the accuracies of these machine learning models depends largely on the amount of training data used to train them. Annotating ground truth training images can be prohibitively costly, especially where the images are annotated on a pixel-wise basis. Moreover, for purposes of counting constituent plant parts (e.g., fruits, flowers, leaves, pods, etc.) per instance of plant, it may be difficult to distinguish between individual plants in densely crowded digital imagery, much less determine which parts belong to which plant instance.

SUMMARY

Implementations disclosed herein are directed towards automatically generating synthetic training images that simulate plants in an area, and automatically and uniquely labeling constituent parts of individual plants in the synthetic training image. For example, a system configured with selected aspects of the present disclosure can automatically generate a synthetic training image of a plant and can automatically label each part of the synthetic plant, such as leaves, flowers, fruit, pod, stem, etc., such that not only are the parts distinguishable from each other, but that individual plants are also distinguishable from each other. In some implementations, the synthetic training images can be used as training data for training machine learning models to detect, segment, and/or classify various types of plants and/or their constituent parts in digital images.

In some implementations, a plurality of three-dimensional (3D) synthetic plants may be generated individually so that they are distinct from each other. Various aspects of each synthetic plant, including but not limited to leaf shapes/contours, leaf sizes, leaf textures, height, flower/fruit counts, etc. may be generated at least in part, randomly, stochastically, and/or non-deterministically. In some implementations, one or more generated aspects of each synthetic plant, such as each generated leaf in a synthetic plant, can be annotated, e.g., collectively and or on an individual basis. For example, pixels corresponding to an individual leaf may be color coded and/or annotated with a unique identifier (unique for the leaf and/or unique for the plant of which the leaf forms part), each individual leaf may be annotated by a bounding box, individual leaves may be annotated in additional or alternative ways, and/or combinations thereof. In some implementations, these 3D synthetic plants may be graphically incorporated into a real-life digital image that captures an area of agricultural interest such as a field, plot, garden, etc. The resulting synthetic training image and annotated leaves may be used to train machine learning models to detect, for instance, individual leaves of the same types of plants that are represented by the 3D synthetic plants.

In some implementations, to create a synthetic training image, the 3D synthetic plants may be generated and/or graphically incorporated with the digital image that captures the area to reflect an agricultural history of the area that existed at and/or leading up to the moment the digital image of the area was acquired. For example, the agriculture history of the area may include environmental conditions and/or stewardship factors such as temperature, precipitation, sunlight exposure, fertilizer application, soil composition, pH levels, pest infestation, and/or pesticide application, to name a few. These data may be taken into account when generating the 3D synthetic plants. In other implementations, the 3D synthetic plants may be graphically incorporated into computer-generated synthetic images of environments.

In some implementations, the 3D synthetic plants may be placed in the digital image close to other 3D synthetic plants and/or close to real plants captured in the digital image. If all the synthetic plants were annotated with the same labels, it may be difficult to distinguish one or more leaves from one synthetic plant from one or more leaves from another synthetic plant and/or one or more leaves from a real plant. For example, leaves from a first synthetic plant may overlap with leaves from second synthetic plant placed close to the first synthetic plant. Labeling leaves in real-life digital images as belonging to individual plants by hand is computationally expensive, time consuming, and frequently is inaccurate as it may be impossible to identify which plant and/or leaf an individual pixel belongs to.

Accordingly, with implementations described herein training instances where individual plant parts are automatically segmented on a plant-by-plant basis may yield an individual plant part segmentation mask that is usable to discern which individual plant parts such as leaves belong to which plant. In some implementations, an individual plant part segmentation mask may be used, e.g., alone or in combination with a whole plant segmentation mask in which all pixels belonging to the plant are annotated, to label each plant part (e.g., each leaf, flower, fruit, etc.) in 2D synthetic training images. In some implementations, these two masks may be overlaid on a synthetic 2D digital image on which a realistic or "textured" plant model has already been incorporated, allowing each leaf (and/or other individual plant parts) to be labeled in the 2D synthetic image.

Techniques described herein allow for a large number of such annotated training instances can quickly be generated. Training a machine learning model with more accurate training instances and/or a larger number of training instances can increase the accuracy of the model in identifying aspects of one or more plants.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
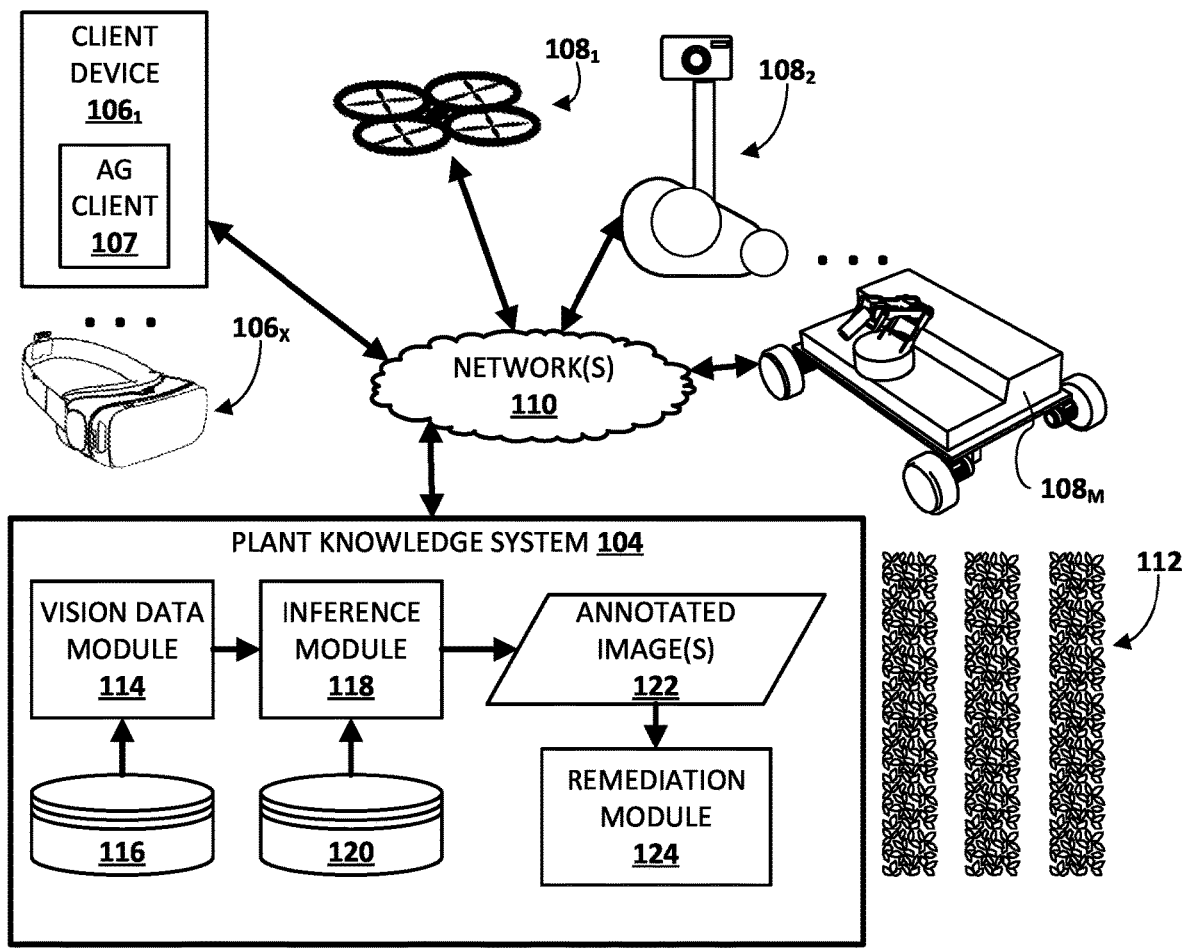
FIG. 1 schematically depicts an example environment in which selected aspects of the present disclosure may be employed in accordance with various implementations disclosed herein.

FIG. 1 schematically illustrates an environment in which one or more selected aspects of the present disclosure may be implemented, in accordance with various implementations. The example environment includes one or more agricultural areas 112 and various equipment that may be deployed at or near those areas, as well as other components that may be implemented elsewhere, in order to practice selected aspects of the present disclosure. Various components in the environment are in communication with each other over one or more networks 110. Network(s) 110 may take various forms, such as one or more local or wide area networks (e.g., the Internet), one or more personal area networks ("PANs"), one or more mesh networks (e.g., ZigBee, Z-Wave), etc.

Agricultural area(s) 112 may be used to grow various types of crops that may produce plant parts of economic and/or nutritional interest. Agricultural area(s) 112 may include, for instance, one or more crop fields, one or more plots, one or more gardens, one or more greenhouses, or any other areas in which there may be an interest or desire to automatically detect, classify, and/or segment particular types of plants. As one non-limiting example, there may be considerable interest and/or benefit in automatically detecting undesired plants, sometimes referred to as "weeds," in an area 112 in which other desired plants are being grown. Once detected, various remedial actions may be taken, such as flagging the weeds' locations for removal or treatment (e.g., herbicide application) by agricultural personnel and/or farming equipment.

Desired plants may take any form depending on the circumstances, and may include, but are not limited to, plants such as strawberry plants, soybeans, beans, corn, cabbage, lettuce, spinach, wheat, berries, etc. Undesired plants or weeds may include, but are not limited to, dandelions, waterhemp, giant ragweed, marestail (also commonly known as horseweed), common lambsquarters, common groundsel, field pansy, mayweed or dog fennel, pineapple-weed or chamomile, several pigweeds, and white campion, yellow woodsorrel, yellow nutsedge, etc.

An individual (which in the current context may also be referred to as a "user") may operate one or more client devices $106_{1-x}$ to interact with other components depicted in FIG. 1. A client device 106 may be, for example, a desktop computing device, a laptop computing device, a tablet computing device, a mobile phone computing device, a computing device of a vehicle of the participant (e.g., an in-vehicle communications system, an in-vehicle entertainment system, an in-vehicle navigation system), a standalone interactive speaker (with or without a display), or a wearable apparatus that includes a computing device, such as a head-mounted display ("HMD") $106_x$ that provides an AR or VR immersive computing experience, a "smart" watch, and so forth. Additional and/or alternative client devices may be provided.

Plant knowledge system 104 is an example of an information system in which the techniques described herein may be implemented. Each of client devices 106 and plant knowledge system 104 may include one or more memories for storage of data and software applications, one or more processors for accessing data and executing applications, and other components that facilitate communication over a network. The operations performed by client device 106 and/or plant knowledge system 104 may be distributed across multiple computer systems.

Each client device 106 may operate a variety of different applications that may be used to perform various agricultural tasks, such as crop yield prediction and diagnosis. For example, a first client device $106_1$ operates agricultural ("AG") client 107 (e.g., which may be standalone or part of another application, such as part of a web browser). Another client device $106_x$ may take the form of a HMD that is configured to render 2D and/or 3D data to a wearer as part of a VR immersive computing experience. For example, the wearer of client device $106_x$ may be presented with 3D point clouds representing various aspects of objects of interest, such as fruits of crops, weeds, crop yield predictions, etc. The wearer may interact with the presented data, e.g., using HMD input techniques such as gaze directions, blinks, etc.

In some implementations, AG client 107 may be used to communicate to agricultural personnel instructions and/or information that can help them perform various agricultural tasks. For example, a remediation module 124 (described in more detail below) may generate a report, a map, instructions, and/or any other data that may be presented to an operator of a client device using a graphical user interface, audibly, etc. These data may inform the agricultural personnel where targeted plants such as weeds are located, what action(s) should be taken on those plants, a timeframe in which those action(s) should be taken, etc.

In some implementations, one or more robots $108_{1-M}$ may be deployed to perform various agricultural tasks. Performance of some of these tasks, including but not limited to weed remediation, may be performed using machine learning model(s) trained on synthetic training data created using techniques described herein. An individual robot $108_{1-M}$ may take various forms, such as an unmanned aerial vehicle $108_1$, a robot (not depicted) that is propelled along a wire, track, rail or other similar component that passes over and/or between crops, wheeled robots $108_2$ to $108_m$, or any other form of robot capable of being propelled or propelling itself past crops of interest.

In some implementations, different robots may have different roles, e.g., depending on their capabilities. For example, in some implementations, one or more of robots $108_{1-M}$ may be designed to capture data, others may be designed to manipulate plants or perform physical agricultural tasks, and/or others may do both. Robots 108 may include various types of sensors, such as vision sensors (e.g., 2D digital cameras, 3D cameras, 2.5D cameras, infrared cameras), inertial measurement unit ("IMU") sensors, Global Positioning System ("GPS") sensors, X-ray sensors, moisture sensors, lasers, barometers (for local weather information), photodiodes (e.g., for sunlight), thermometers, etc.

In various implementations, plant knowledge system 104 may be implemented across one or more computing systems that may be referred to as the "cloud." Plant knowledge system 104 may receive vision data generated by robots 108$_{1-M}$ (and/or robots at other agricultural sites and process it using various image processing techniques to perform tasks such as plant detection, classification, and/or segmentation. In various implementations, plant knowledge system 104 may include a vision data module 114 and an inference module 118. In some implementations one or more of modules 114 and 118 may be omitted, combined, and/or implemented in a component that is separate from plant knowledge system 104.

Plant knowledge system 104 may also include one or more databases. For example, plant knowledge system 104 may include, in communication with vision data module 114, an imagery database 116 for storing image data captured by, for instance, agricultural personnel and/or one or more robots 108$_{1-M}$. Plant knowledge system 104 may also include a machine learning model database 120 that includes one or more machine learning models that are trained based on synthetic training data generated using techniques described herein. In this specification, the term "database" and "index" will be used broadly to refer to any collection of data. The data of the database and/or the index does not need to be structured in any particular way and it can be stored on storage devices in one or more geographic locations.

Vision data module 114 may be configured to obtain digital images and/or other imagery data from various sources, such as imagery database 116 purposed as an imagery clearinghouse, as well as from sources such as robots 108$_{1-M}$. Vision data module 114 may then provide these imagery data to inference module 118. In other implementations, vision data module 114 may be omitted and the functions described herein as being performed by vision data module 114 may be performed by other components of plant knowledge system 104, such as inference module 118.

Inference module 118 may be configured to apply imagery data received from vision data module 114 as input across various machine learning models stored in machine learning model database 120 to generate output. This output may be indicative of plants that are detected, segmented, and/or classified in imagery data received from vision data module 114. To this end, machine learning models stored in database 120 may be trained to detect, classify, and/or segment plants within imagery data, such as two-dimensional digital images of agricultural area(s) 112 captured by agricultural personnel and/or by robot(s) 108.

Various types of machine learning models may be trained, e.g., using synthetic training data generated using techniques described herein, to detect, classify, and/or segment particular types plants in imagery data. In some implementations, a convolutional neural network ("CNN") may be trained to generate output indicative of one or more types of plants detected in digital imagery. In FIG. 1, for instance, inference module 118 generates annotated image(s) 122 that include pixel-wise annotations identifying one or more detected plants. These pixel-wise annotations may be used, for instance, to segment the digital image into portions showing targeted plant types, such as weeds. In some such implementations, a remediation module 124 may be configured to take remedial action using these annotated and/or segmented images 122. For example, in some implementations, remediation module 124 may deploy one or more robots 108 to take remedial action on the detected plants, such as pulling weeds, spraying weeds with chemicals, destroying weeds using other mechanical and/or energy-based means, harvesting desired plant parts (e.g., fruits, flowers, etc.), and so forth. In other implementations, inference module 118 may output one or more probabilities that one or more plant types are detected in an image. In some implementations, remediation module 124 may provide output that includes, for instance, weed remediation instructions and/or a map of weeds for remediation by agricultural personnel.

In some implementations, one or more components of plant knowledge system 104 may be implemented in whole or in part on a robot 108. For example, inference module 118 may be implemented in whole or in part on a robot 108 that is also equipped with a vision sensor such as a two-dimensional camera. By having an onboard inference module 118, robot 108 may be able to process its own images to quickly detect targeted plants, such as weeds. Robot 108 may also include its own remediation module 124 that enables robot 108 to take remedial action, such as destroying or otherwise remediating the detected plant(s).

As noted previously, obtaining sufficient ground truth training data to train machine learning model(s) such as CNNs to detect particular types of plants, especially undesirable plants such as weeds, may be resource-intensive and/or difficult. While images of desired crops may be captured relatively frequently, pictures of undesirable crops such as weeds may be less common. Accordingly, techniques are described herein for generating synthetic training data with little or no human intervention that can be used to train machine learning model(s) such as CNNs to detect particular types of plants, such as weeds.

Figure 2:
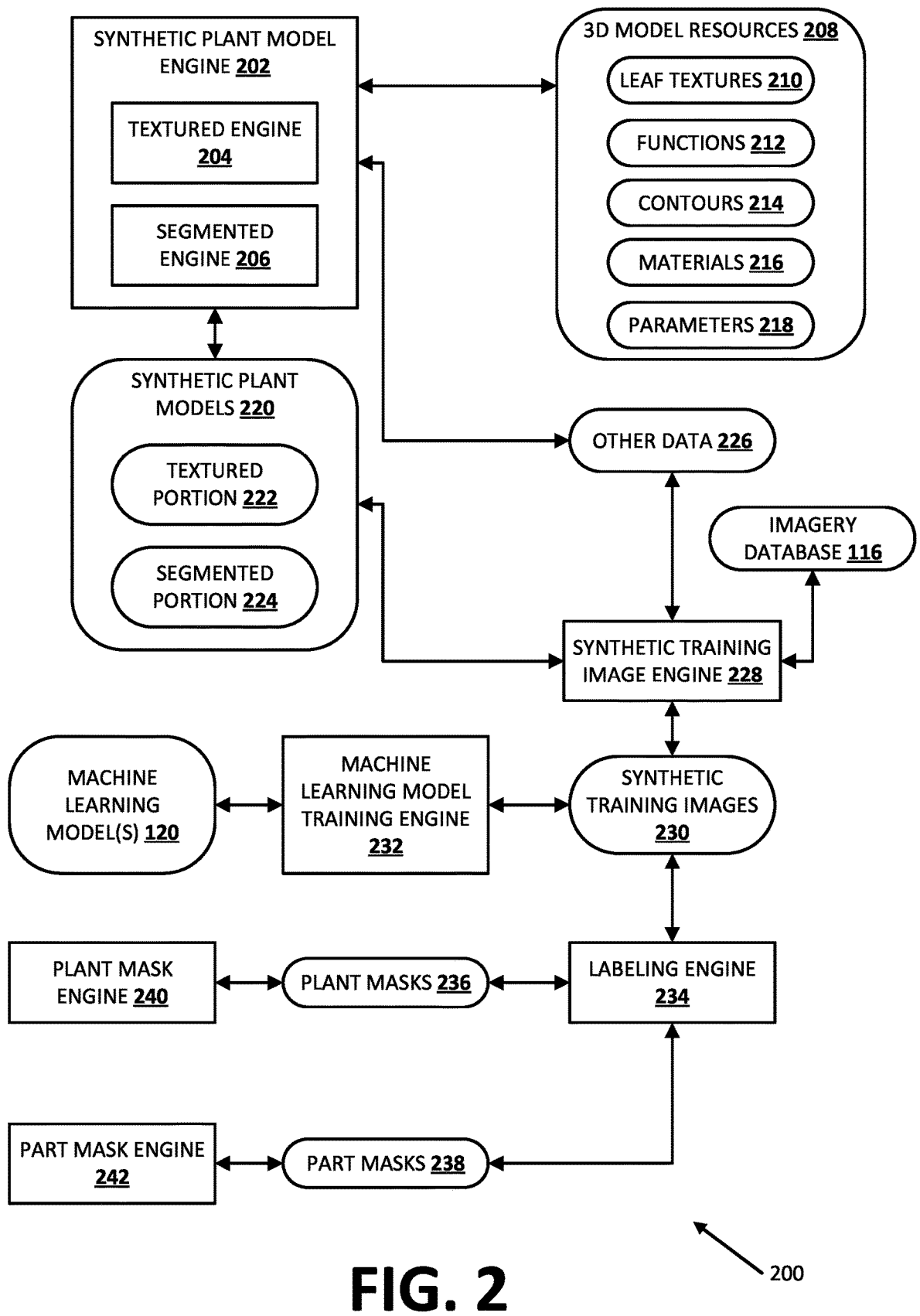
FIG. 2 schematically depicts components and a process for practicing selected aspects of the present disclosure, in accordance with various implementations disclosed herein.

FIG. 2 depicts an example 200 process flow for generating synthetic training images in accordance with various implementations described herein. Starting at the top right, 3D model resources 230 may include data, parameters, and/or any other information about plants, such as weeds, that may be useable to generate realistic 3D models of plants. 3D model resources 208 may include, for instance, leaf textures 210, various functions 212, contours 214 for leaves, stems, and/or other aspects of plants, materials 216, and miscellaneous parameters 218 such as leaf sizes, scale ratios, desired resolution, etc. Functions 212 may include, for instance, programmatic routines, computer-readable instructions, scripts, pseudo-code, algorithms, heuristics, statistics, etc., that are use, e.g., by a synthetic plant model engine 202 to generate 3D plant models. Materials 216 may include, for instance, data similar to texture data that is used to simulate different types of plant structures, such as stems.

Synthetic plant model engine 202 can be used to generate one or more synthetic plant models 220. In some implementations, synthetic plant model engine 202 can include a textured engine 204 which can be used to generate a textured portion 222 of a given synthetic plant model 220, and a segmented engine 206 which can be used to generate a segmented portion 224 of the given synthetic plant model 220.

Synthetic plant model engine 202 can select various assets from 3D model resources 208 for use in generating the synthetic plant model 220. This selection may be random or pseudo-random in order that each synthetic plant model that is generated for inclusion in the training data is different from each other, as would be the case in real life. In some implementations, the random or pseudo-random selection may be based at least in part on other data 226, which may include agricultural history of the area that was photographed and/or observable attributes of the areal (e.g., evidenced in the digital image). For example, assets that are more consistent with the environmental conditions of the agricultural area depicted in the digital photography may be weighted more heavily (and hence, more likely to be selected) that other assets that are less consistent with the environmental conditions.

Additionally or alternatively, synthetic plant model engine 202 can process the randomly selected assets and/or an object representative thereof (e.g., an XML file that spells out how many leaves, their size, a size of the plant, a color of the plant, etc.), which also may or may not be part of plant knowledge system 104 and may be implemented using any combination of hardware or computer-readable instructions. Based on these objects and/or the assets represented/conveyed by these objects, synthetic plant model engine 202 may generate synthetic plant models 220.

This selection may be random or pseudo in order that each synthetic plant model that is generated for inclusion in training data is different from each other, as would be the case in real life. In some implementations, the random or pseudo random selection may be based at least in part on other data 226, which may include agricultural history of the area that was photographed and/or observable attributes of the area (e.g., evidenced in the digital image). For example, assets that are more consistent with the environmental conditions of the agricultural area depicted in the digital photograph may be weighted more heavily (and hence, more likely to be selected) than other assets that are less consistent with the environmental conditions.

In some implementations, a given synthetic plant model 220 can include a textured portion 222 and a corresponding segmented portion 224. The textured portion 222 can be a 3D model of a synthetic plant generated using one or more of the randomly selected assets and/or the object representative thereof. The texture portion 222 of a given synthetic plant model 220 can be generated, using the synthetic plant model engine 202, based on one or more leaf textures 210, a contour 214 corresponding to each leaf, one or more contours 214 corresponding to one or more stems, one or more leave sizes, etc. For example, the texture portion 222 of the given synthetic plant model 220 can include a 3D model of a synthetic plant with three leaves, where each leaf has a randomly selected leaf texture and a corresponding randomly selected leaf size. An example textured portion 222 of an example synthetic plant model is described herein with respect to FIG. 3A.

The segmented portion 224 of a given synthetic plant model 220 can be generated using the segmented engine 206. In some implementations, the segmented portion 224 can uniquely identify one or more portions of the synthetic plant model 220. For example, the segmented portion 224 can uniquely identify the stem of the plant, each leaf of the plant, one or more additional or alternative portions of the plant, and/or combinations thereof. For example, when the synthetic plant model 220 is a plant with three leaves, each of the leaves can be uniquely identified. For instance, pixel(s) corresponding to a first leaf can be identified in the segmented portion 224 by a first color, pixel(s) corresponding to a second leaf can be identified in the segmented portion 224 by a second color, and pixel(s) corresponding to a third leaf can be identified in the segmented portion 224 by a third color. An example of a segmented portion 224 of an example synthetic plant model is described herein with respect to FIG. 3B.

In some implementations, the other data 226 may be used, e.g., by the synthetic plant model engine 202 to generate the synthetic plant models. For example, as described previously, the other data 226 may affect probabilities of constituent assets of 3D model resources 208 being selected stochastically. Other data 226 may include an agricultural history of an agricultural area (e.g., 112) of interest. The agricultural area of interest may be, for instance, a field or plot of which one or more digital images have been captured, e.g., by one or more robots $108_{1-M}$. These digital images may effectively be used as canvases on which 3D models can be graphically incorporated to generate the synthetic training images 230. In fact, these digital images, prior to being augmented with synthetic plants, may be referred to herein as "canvas" digital images.

Other data 226 may additionally or alternatively include, for instance, an agricultural history of the area 112 during a time interval preceding capture of image data that depicts the agricultural area. This agricultural history may include a wide variety of data about the agricultural area being depicted, such as precipitation data, stewardship data, soil data, weather data, fertilizer data, herbicide data, pest data, plant disease data, etc.

Synthetic training image engine 228 can generate one or more synthetic training images 230. For example, synthetic training image engine 228 can generate a synthetic training image 230 based on processing one or more images from imagery database 116 (e.g., via vision data module 114) and one or more synthetic plant models 220. In some implementations, the one or more images from imagery database 116 may depict agricultural area(s) (e.g., 112) under a variety of conditions. For example, multiple images may capture the same agricultural area under a cloudy sky, during a rain storm, on a sunny day, on a foggy day, at different times of day (at which points of the sun will be at different positions in the sky), and so forth.

In additional to the imagery retrieved from database 116, in some implementations, at least some of the other data 226 mentioned previously may also be retrieved and used by synthetic training image engine 228 for use in generating synthetic training images 230, particularly for graphically incorporating the 3D plant models into the canvas digital images that depict the agricultural area 112. This may include, for example, the other data 226 that coincides with the agricultural area(s) depicted in the imagery, such as environmental conditions leading up to and including the moment at which the imagery was captured. This may also include the lighting condition mentioned previously. For example, synthetic training image engine 228 may render adjacent 3D plant models on the two-dimensional canvas image and shadows that simulate real life shadows that would be present if the 3D plant models were actually present in the agricultural area 112, taking into account the lighting condition at the time the underlying digital image was captured.

In some implementations, synthetic training image engine 228 may be further configured to space the plurality of 3D synthetic plants for each other in the synthetic training image 230 based on various pieces of other data 226, such as environmental conditions leading up to the moment the digital image was captured and/or the presence of other plants. If an agricultural area is growing a robust and healthy crop of desired plants, for instance, these plants my choke out other, less desirable plants such as weeds. Accordingly, synthetic training image engine 228 may space 3D synthetic weeds relatively far from each other in a digital image that depicts healthy and robust crops. On the other hand, if the crops are less robust or healthy, there may be more opportunity for weeds to flourish. Accordingly, synthetic training image engine 228 may space 3D synthetic weeds relatively close to each other in a digital image that depicts unhealthy and/or sparse crops. Similarly, synthetic training image engine 228 may space 3D synthetic weeds or other plants from each other based on environmental conditions in the agricultural area. If there is a drought, and the 3D synthetic plants are intended to model weeds that struggle in dry conditions, the 3D synthetic plants may be spaced relatively far from each other.

Figure 4A:
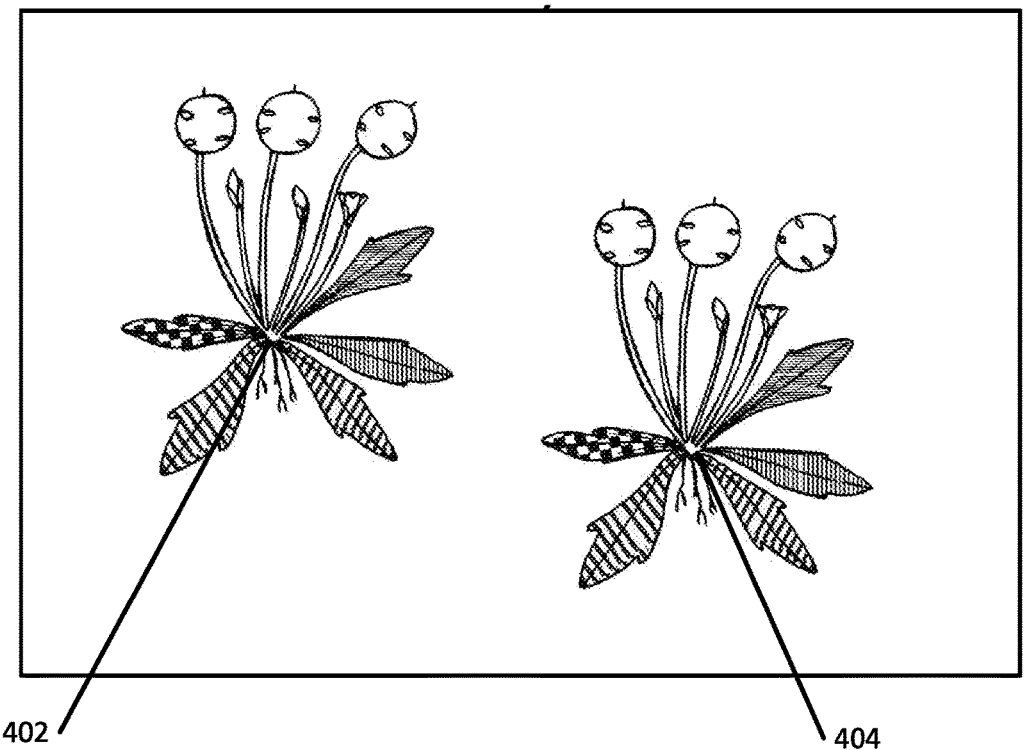
FIG. 4A depicts a leaf mask for use in labeling one or more portions of a synthetic plant model in accordance with various implementations disclosed herein.
Figure 4B:
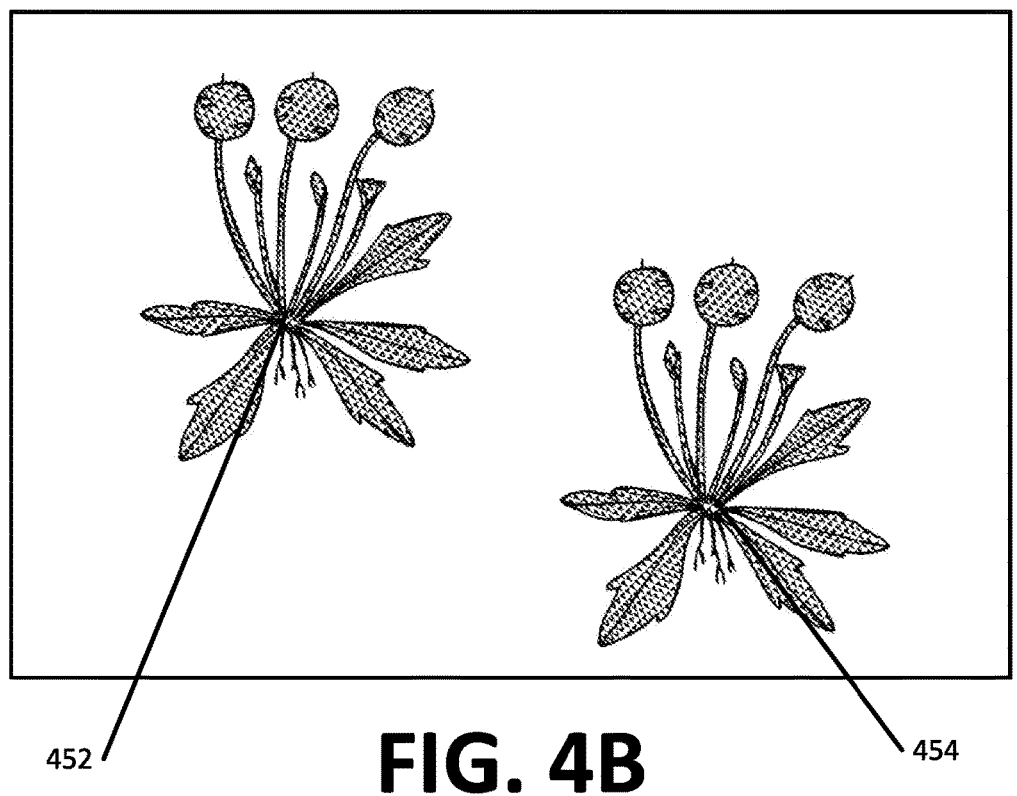
FIG. 4B depicts a plant mask for use in labeling one or more portions of a synthetic plant model in accordance with various implementations disclosed herein.

Labeling engine 234 can be used to label one or more portions of the synthetic plants in a synthetic training image 230. In some implementations, plant mask engine 240 can process the corresponding synthetic plant model 220 to generate a corresponding plant mask 236. The plant mask can identify one or more synthetic plants as a whole (e.g., identify the entire plant instead of identifying portions of the plant) in the synthetic training image 230. In some implementations, plant mask engine 240 can process a given synthetic plant model 220 in a given synthetic training image 230 to generate a corresponding plant mask 236. FIG. 4B described herein illustrates an example plant mask.

Part mask engine 242 can process the given plant model 220 in a given synthetic training image 230 to generate a corresponding part mask 238. In some implementations, the plant mask engine 242 can process the segmented portion 224 of the given synthetic plant model 220 to generate the corresponding part mask 238. For example, the segmented portion 224 of the given synthetic plant model 220 can uniquely identify each leaf of the synthetic plant with a different color (e.g., identifying pixel(s) corresponding to individual leaves with a unique color). FIG. 4A described herein illustrates an example part mask.

Labeling engine 234 can label portion(s) of a given synthetic plant model based on a corresponding plant mask 236 and part mask 238. In some implementations, labeling engine 234 can overlay the plant mask 236 and/or the part mask 238 onto the corresponding synthetic training image 230 to label portion(s) of the given synthetic plant model. For example, labeling engine 234 can overlay the plant mask 236 and the part mask 238 corresponding to a synthetic plant model 220 in a synthetic training image 230. Portion(s) of the synthetic training image 230 can be labeled based on part(s) identified in the part mask 238.

One or more machine learning models 120 can be trained using machine learning model training engine 232 based on one or more synthetic training images 230 and corresponding synthetic plant part labels. In some implementations, the one or more machine learning models can be trained to detect, segment, and/or classify various parts of plants in digital images. Additionally or alternatively, one or more of the machine learning models 120 can be trained to detect, segment, and/or classify one or more plants in digital images.

Figure 3A:
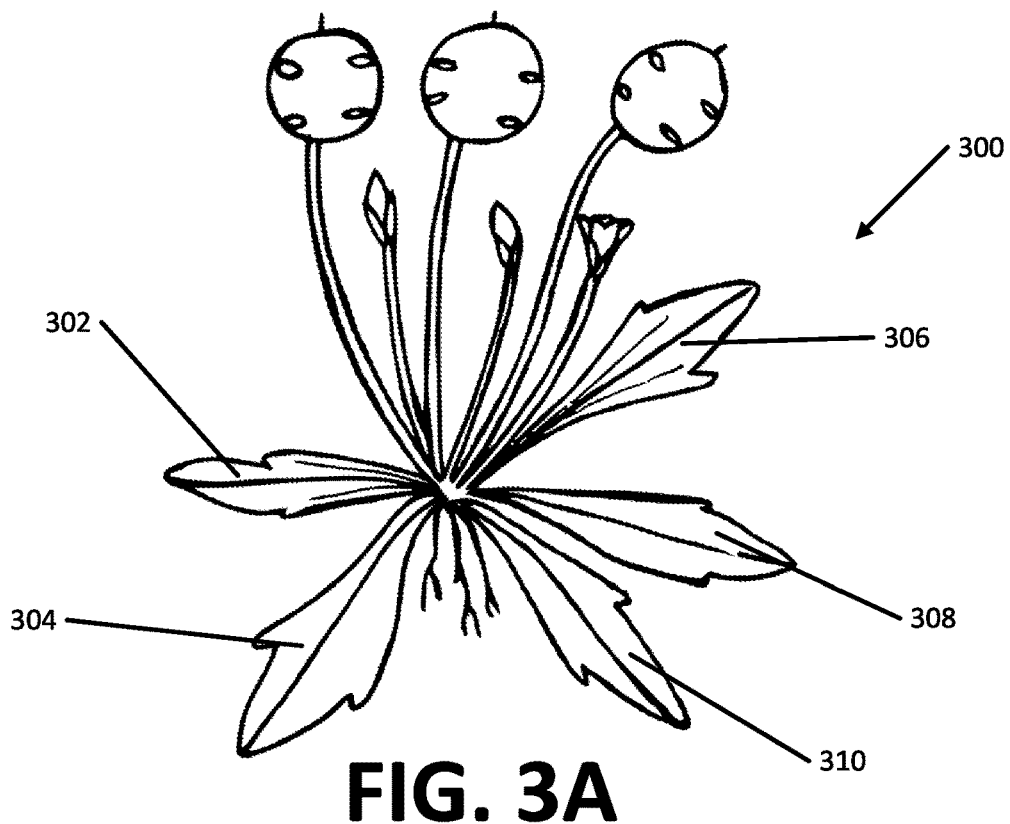
FIG. 3A depicts a textured portion of a synthetic plant model in accordance with various implementations disclosed herein.
Figure 3B:
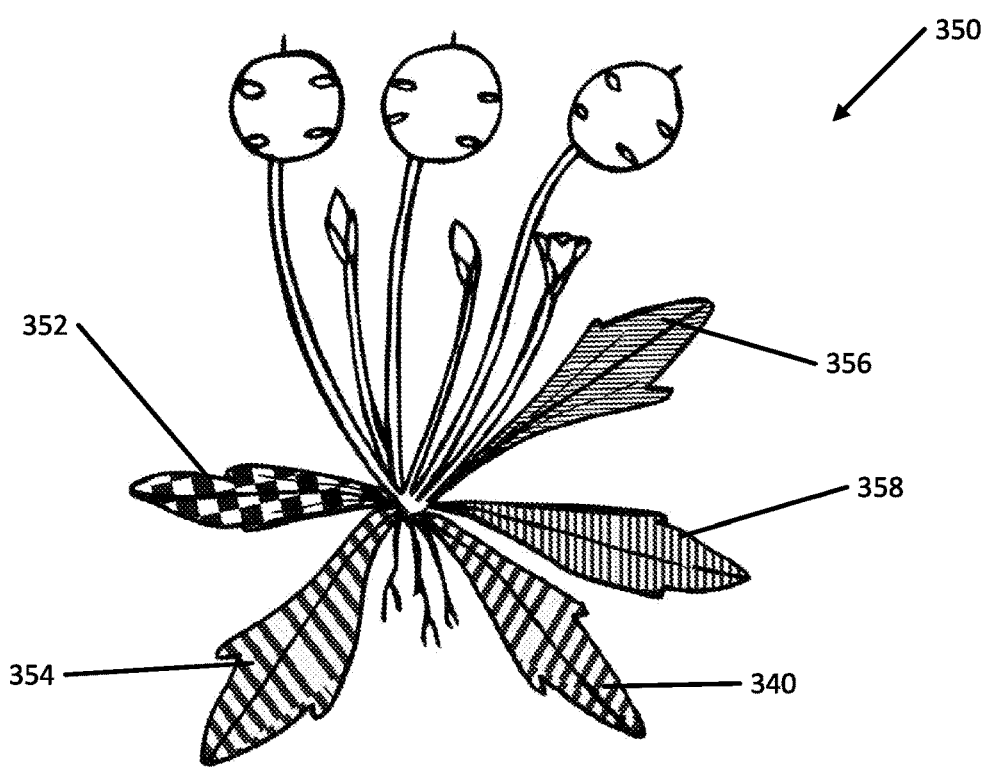
FIG. 3B depicts a segmented portion of a synthetic plant model in accordance with various implementations disclosed herein.

FIGS. 3A and 3B depict an example synthetic plant model in accordance with various implementations disclosed herein. FIG. 3A illustrates an example textured portion 300 of the synthetic plant model, and FIG. 3B illustrates a corresponding segmented portion 350 of the synthetic plant model. Example textured portion 300 is a plant with five leaves (i.e., the first leaf 302, the second leaf 304, the third leaf 306, the fourth leaf 308, and the fifth leaf 310), three flowers, and three flower buds. Each of the flowers and the flower buds are connected to the leaves via a distinct stem. In some implementations, the textured portion 300 of the synthetic plant model can be three-dimensional. For example, the textured portion 300 can be generated using textured engine 204 of synthetic plant model engine 202 as described herein with respect to FIG. 2.

Turning to FIG. 3B, example segmented portion 350 of the synthetic plant model captures the same synthetic plant model captured in the textured portion 300 including the five leaves, the three flowers, the three flower buds, and the unique stem connecting each flower and flower bud to the leaves. Additionally or alternatively, segmented portion 350 can uniquely identify one or more portions of the synthetic plant. In the illustrated example, each of the five leaves are uniquely identified. However, additional or alternative portion(s) of the synthetic plant model can be uniquely identified in the segmented portion 350 of the synthetic plant model, such as uniquely identifying the flowers, the flower buds, the stems, one or more additional or alternative plant parts, and/or combinations thereof.

In some implementations, the portions of the synthetic plant can be uniquely identified by augmenting each pixel of a unique part with a unique color. For instance, in segmented portion 350, pixels corresponding to the first leaf 352 are identified with a checkered pattern, pixels corresponding to the second leaf 354 are identified with stripes slanting to the right, pixels corresponding to the third leaf 356 are identified with horizontal lines, pixels corresponding to the fourth leaf 358 are identified with vertical lines, and pixels corresponding to the fifth leaf 340 are identified with stripes slanting to the left. Synthetic plant parts can be identified using additional or alternative techniques, such as with a solid color, with a numerical value, with a string of characters, with one or more additional or alternative labeling methods, and/or combinations thereof.

Figure 5:
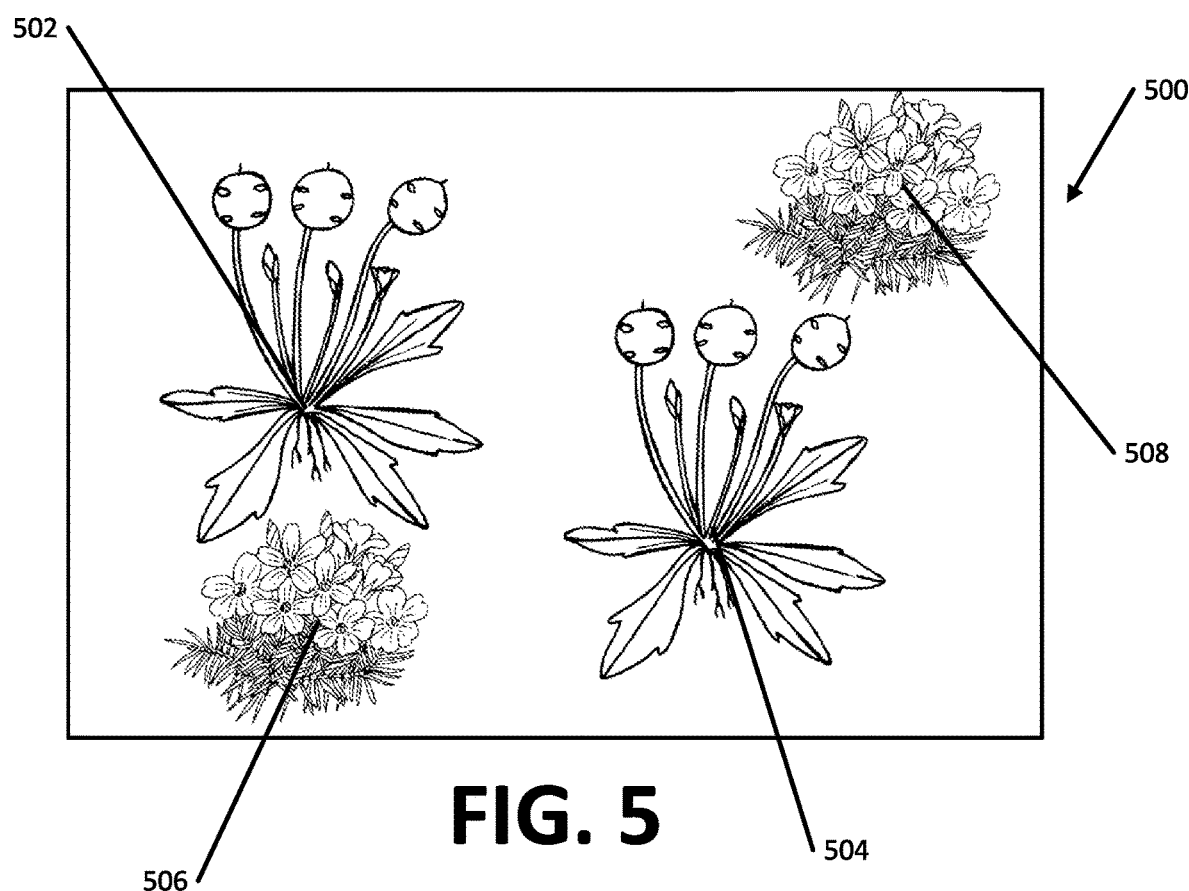
FIG. 5 depicts a synthetic training image generated in accordance with various implementations disclosed herein.

FIG. 5 illustrates an example synthetic training image 500 generated in accordance with various implementations disclosed herein. In some implementations, the synthetic training image 500 can be generated based on processing one or more synthetic plant models 220 and one or more images from imagery database 116 using a synthetic training image engine 228. The one or more images can capture an agricultural area. Some of the images can additionally capture existing plants in the agricultural area.

In the illustrated example, the synthetic training image 500 includes synthetic plants 502 and 504 as well as additional plants 506 and 508. In some implementations, the additional plants 506 and 508 are additional synthetic plants. In some other implementations, the additional plants 504 and 506 are plants preexisting in the one or more images from the imagery database. Example synthetic training image 500 can be generated by processing one or more images from the imagery database 116 (e.g., an image capturing an agricultural area with or without existing plants) along with (a) the textured portion of synthetic plant model 300 described herein with respect to FIG. 3A and (b) the segmented portion of the synthetic plant model 350 described herein with respect to FIG. 3B. In the illustrated synthetic training image 500, the synthetic plants 502 are generated based on the same synthetic plant model illustrated in FIGS. 3A and 3B. However, this is merely illustrative and additional or alternative synthetic training images can include one or more synthetic plants generated based on one or more additional synthetic plant models.

In some implementations, one or more portions of the synthetic plans can be labeled (e.g., labeled using a bounding box) in the synthetic training image. For example, one or more of the leaves, one or more of the flowers, one or more of the flower buds, and/or one or more of the stems of synthetic plants 502 and/or 504 can be labeled. In some implementations, the one or more portions of the synthetic plant(s) can be labeled in the synthetic training image based on a corresponding part mask and/or a plant mask, such as part mask 400 and plant mask 450 illustrated in FIGS. 4A and 4B.

Plant mask 450 can identify individual synthetic plants within the synthetic training image. Plant mask 450 identifies a first synthetic plant 452 and a second synthetic plant 454. In some implementations, plant mask 450 can identify one or more pixels corresponding to each synthetic plant. For example, pixels corresponding to the first synthetic plant 452 and pixels corresponding to the second synthetic plant 454 are identified by a pattern. Additionally or alternatively, pixel(s) corresponding to synthetic plant(s) in a plant mask can be identified by a color, by a numerical value, by a text string, by additional or alternative techniques, and/or combinations thereof. In some implementations, synthetic plant(s) can be identified based on a corresponding synthetic plant model. For example, pixel(s) corresponding to synthetic plant 424 can be identified based on a textured portion 300 and/or a segmented portion 350 of the synthetic plant model illustrated in FIGS. 3A and 3B.

Part mask 400 can be used to identify one or more parts of a synthetic plant within the synthetic training image. For example, plant mask 400 identifies a first leaf, a second leaf, a third leaf, a fourth leaf, and a fifth leaf corresponding to a first synthetic plant 402 in the synthetic training image. Pixel(s) corresponding to each part can be identified based on one or more parts identified in the corresponding segmented portion of the synthetic plant model. For example, the leaves identified in segmented portion 350 of the synthetic plant can be used to identify the corresponding leaves in the part mask 400 by augmenting pixel(s) corresponding to each leaf. For instance, pixels corresponding to the first leaf can be identified with a checkered pattern, pixels corresponding to the second leaf can be identified with stripes slanting to the right, pixels corresponding to the third leaf can be identified with horizontal stripes, pixels corresponding to the fourth leaf can be identified with vertical lines, and pixels corresponding to the fifth leaf can be identified with stripes slanting to the left.

Similarly, plant mask 400 identifies a first leaf, a second leaf, a third leaf, a fourth leaf, and a fifth leaf corresponding to a second synthetic plant 404 in the synthetic training image. For example, the leaves identified in the segment portion 350 of the corresponding synthetic plant can be used to identify the corresponding leaves in the second synthetic plant 404. In the illustrated example, the first synthetic plant 402 is based on the same synthetic plant model as the second synthetic plant 404. As such, the leaves of both synthetic plants 402 and 404 are both identified based on the segmented portion 350. However, this is merely illustrative. In some implementations, synthetic plants in a synthetic training image can be based on distinct synthetic plant models, and as such, the parts of each synthetic plant can be identified based on the segmented portion of a corresponding distinct synthetic plant model.

Figure 6:
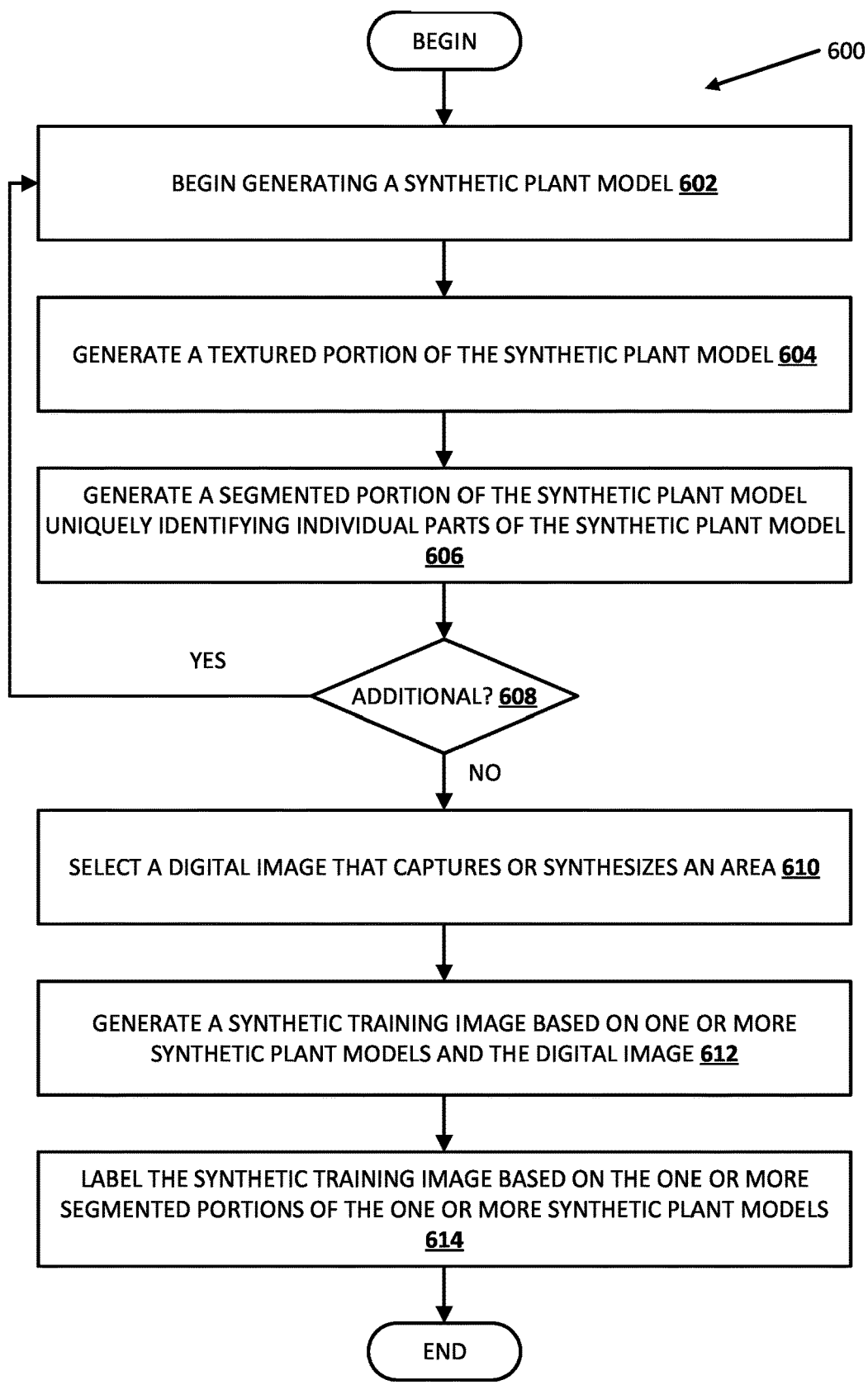
FIG. 6 is a flowchart depicting an example process of generating a labeled synthetic training image in accordance with various implementations disclosed herein.

FIG. 6 is a flowchart illustrating an example process of 600 of generating a labeled synthetic training image in accordance with various implementations disclosed herein. For convenience, the operations of the flowchart are described with reference to a system that performs the operations. This system may include various components of various computer systems, such as one or more components of computing system 810. Moreover, while operations of process 600 are shown in a particular order, this is not meant to be limiting. One or more operations may be reordered, omitted, and/or added.

At block 602, the system begins generating a synthetic plant model. In some implementations, the system can select one or more 3D model resources, such as leaf textures, functions, contours, materials, parameters, and/or additional or alternative resources. For example, the system can select one or more 3D model resources 208 descried herein with respect to FIG. 2. Additionally or alternatively, the system can select other data. For example, the system can select other data, such as other data 226 described herein with respect to FIG. 2. In some implementations, the system can begin generating the synthetic plant model using a synthetic plant model engine, such as synthetic plant model engine 202 described herein with respect to FIG. 2. In some implementations, the system can generate a synthetic plant model such as synthetic plant model 220 including a textured portion 222 and a segmented portion 224 described in FIG. 2 herein.

At block 604, the system generates a textured portion of the synthetic plant model. In some implementations, the textured portion of the synthetic plant model can be a 3D representation of a synthetic plant. For example, the textured portion can include one or more leaf texture corresponding to one or more leaves in the synthetic plant model. In some implementations, the textured portion of the synthetic plant model can be generated using textured engine 204 described herein. An example textured portion of a synthetic plant model is illustrated in FIG. 3A described herein.

At block 606, the system generates a segmented portion of the synthetic plant model uniquely identifying individual parts of the synthetic plant model. For example, the segmented portion of the synthetic plant model can uniquely identify one or more leaves, one or more flowers, one or more flower buds, one or more stems, one or more roots, one or more seeds, one or more seed pods, one or more additional or alternative portions, and/or combinations thereof of the synthetic plant model. In some implementations, the portions of the synthetic plant model can be identified by augmenting one or more pixels corresponding to the part using a unique color, using a unique pattern, using a unique number, using a unique character string, using one or more additional or alternative identifications, and/or combinations thereof. In some implementations, the segmented portion of the synthetic plant model can be generated using a segmented engine, such as segmented engine 206 described herein. In some implementations, the system can generate a segmented portion 224 of synthetic plant model 220 described herein. An example segmented portion of a synthetic plant model is illustrated in FIG. 3B described herein.

At block 608, the system determines whether to generate an additional synthetic plant model. If so, the system proceeds back to block 602 and begins generating an additional synthetic plant model. If not, the process proceeds to block 610. In some implementations, the system can determine whether to generate an additional synthetic plant model based on whether one or more conditions are satisfied, such as whether a threshold number of synthetic plant models have been generated, whether a threshold number of distinct plant types have been generated, whether one or more additional or alternative conditions are satisfied, and/or combinations thereof.

At block 610, the system selects one or more digital images that captures or synthesizes an area. In some implementations, the system can select an image from imagery database 116 described herein. The one or more digital images can capture, for example, an agricultural area. In some implementations, the image(s) capture real plants in the area.

At block 612, the system generates a synthetic training image based on one or more synthetic plant models and the digital image. In some implementations, a synthetic training image can be generated using a synthetic training image engine, such synthetic training image engine 228. In some implementations, the system can position one or more three dimensional synthetic plant models in a two dimensional digital image. An example synthetic training image 500 is described herein with respect to FIG. 5.

At block 614, the system labels the synthetic training image based on the one or more segmented portions of the one or more synthetic plant models. In some implementations, the synthetic training image can be labeled in accordance with process 700 of FIG. 7 described herein.

Figure 7:
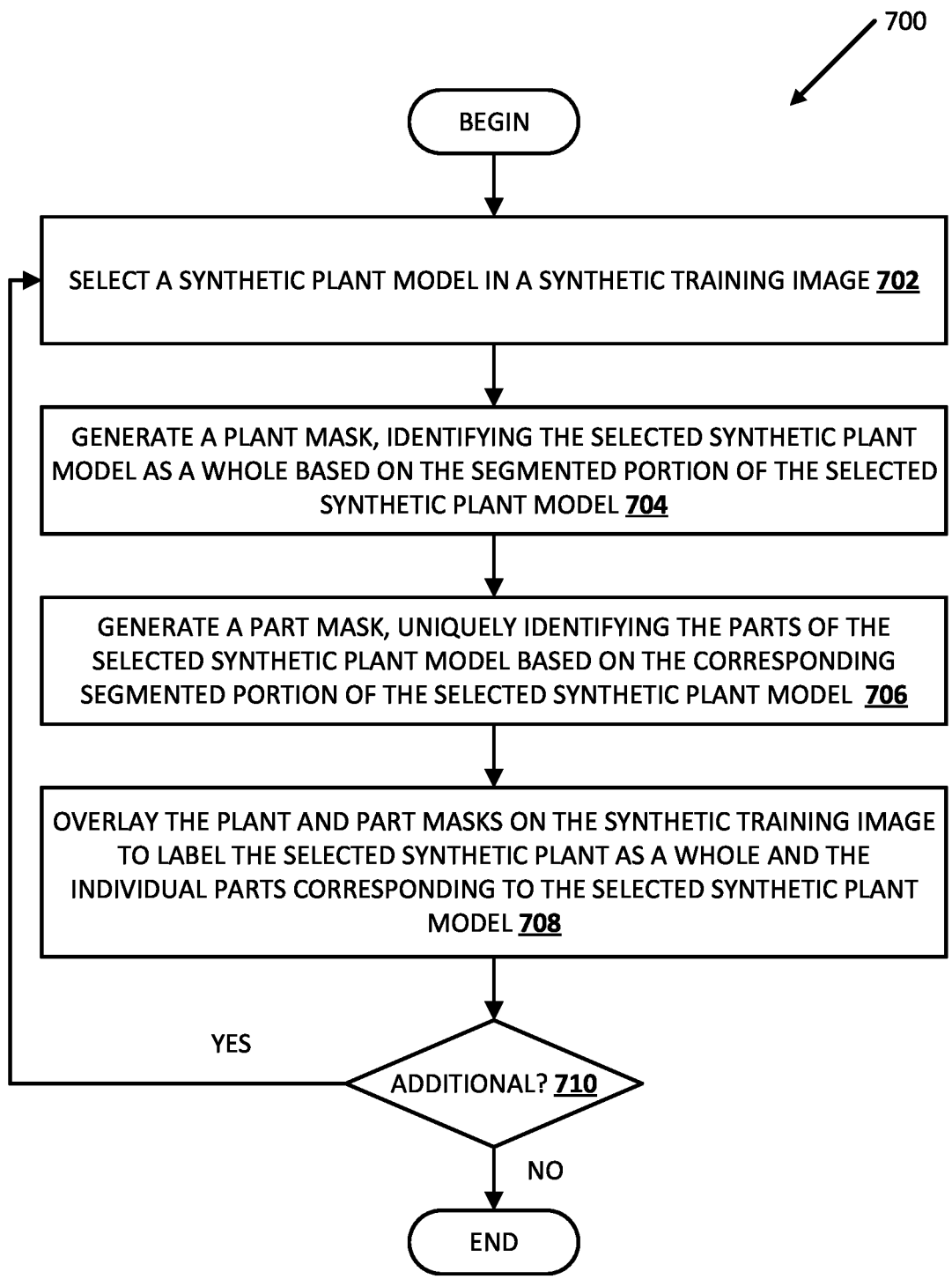
FIG. 7 is a flowchart depicting an example process of labeling a synthetic plant model in accordance with various implementations disclosed herein.

FIG. 7 is a flowchart illustrating an example process of 700 of labeling a synthetic plant model in accordance with various implementations disclosed herein. For convenience, the operations of the flowchart are described with reference to a system that performs the operations. This system may include various components of various computer systems, such as one or more components of computing system 810. Moreover, while operations of process 700 are shown in a particular order, this is not meant to be limiting. One or more operations may be reordered, omitted, and/or added.

At block 702, the system selects a synthetic plant model in a synthetic training image. In some implementations, the synthetic training image can be generated in accordance with process 600 of FIG. 6 described herein. FIG. 5 illustrates an example synthetic training image 500.

At block 704, the system generates a plant mask, identifying the selected synthetic plant model as a whole, based on the segmented portion of the selected synthetic plant model. In some implementations, the plant mask can be generated using a plant mask engine, such as plant mask engine 240. An example plant mask 450 is illustrated in FIG. 4B herein.

At block 706, the system generates a part mask, uniquely identifying one or more prats of the selected synthetic plant model, based on the corresponding segmented portion of the selected synthetic plant model. In some implementations, the part mask can be generated based on the segmented model portion of the corresponding synthetic plant model. An example part mask 400 is described herein with respect to FIG. 4A.

At block 708, the system overlays the plant and part masks on the synthetic training image to label the selected synthetic plant as a whole and the individual parts corresponding to the selected synthetic plant model. For example, the plant mask 450 and part mask 400 can be overlaid onto synthetic training image 500 to label one or more portions of the synthetic plant. In some implementations, the synthetic training image can be labeled using labeling engine 234 described herein.

At block 710, the system determines whether to process an additional synthetic plant model in the synthetic training image. If the system determines to process an additional synthetic plant model in the synthetic training image, the system proceeds back to block 702, selects an additional synthetic training image, and proceeds to blocks 704, 706, and 708 based on the additional synthetic training image. If not, the process ends. In some implementations, the system can determine whether to process an additional synthetic plant model based on whether one or more conditions are satisfied, such as whether there are any remaining unprocessed synthetic plant models in the selected synthetic training image, whether a threshold number of synthetic plant models have been processed, whether synthetic plant models have been processed for a threshold duration of time, whether one or more additional or alternative conditions are satisfied, and/or combinations thereof.

Figure 8:
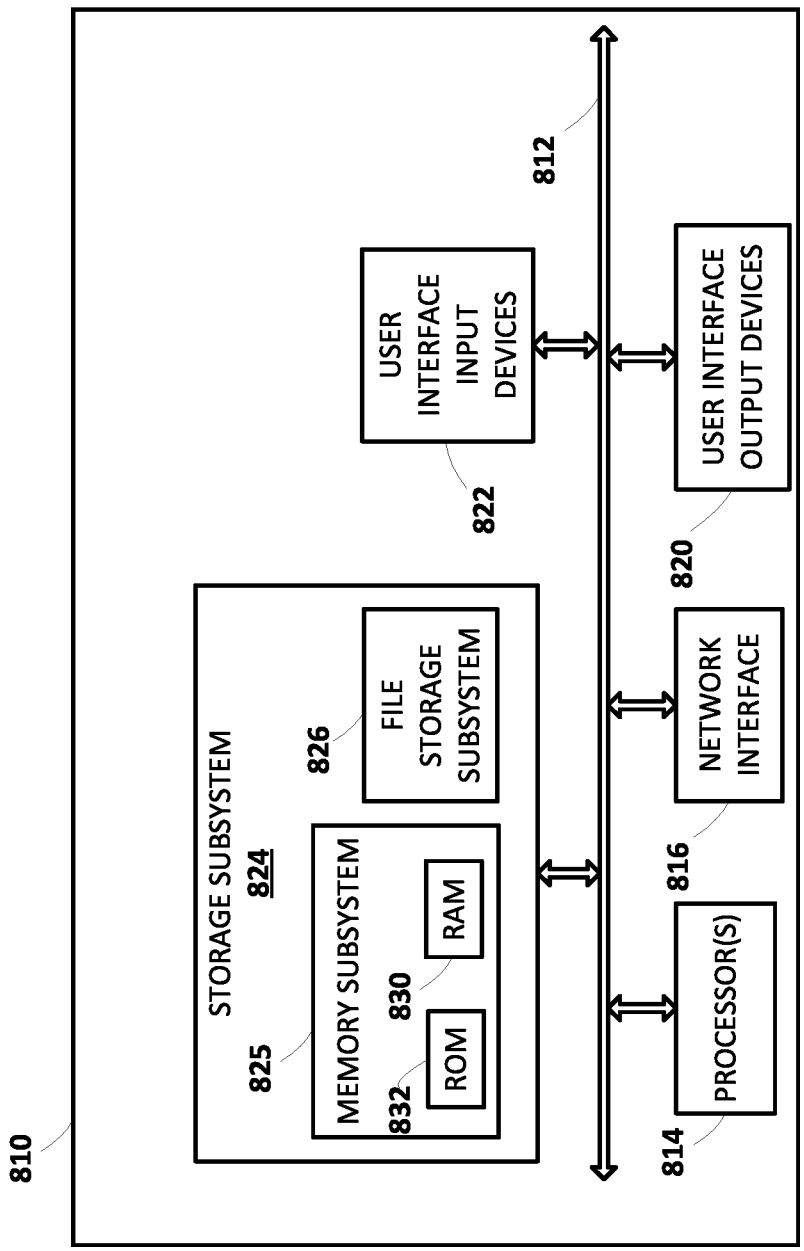
FIG. 8 schematically depicts an example architecture of a computer system.

FIG. 8 is a block diagram of an example computing device 810 that may optionally be utilized to perform one or more aspects of techniques described herein. Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In some implementations in which computing device 810 takes the form of a HMD or smart glasses, a pose of a user's eyes may be tracked for use, e.g., alone or in combination with other stimuli (e.g., blinking, pressing a button, etc.), as user input. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, one or more displays forming part of a HMD, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of process 600 and/or 700 described herein, as well as to implement various components depicted in FIGS. 1 and 2.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

In some implementations, method of generating a labeled synthetic training image is provided, the method implemented by one or more processors, where the method includes: generating one or more synthetic plant models, where each synthetic plant model includes (a) a textured portion of the synthetic plant model and (b) a segmented portion of the synthetic plant model uniquely identifying individual parts of the synthetic plant. In some implementations, the method includes generating the synthetic training image based on (a) one or more texture portions of the one or more synthetic plant models and based on (b) a digital image that captures or synthesizes an area. In some implementations, the method includes labeling the synthetic training image based on one or more of the segmented portions of the one or more synthetic plant models.

These and other implementations of the technology disclosed herein can include one or more of the following features.

In some implementations, for each given synthetic plant model, in the one or more synthetic plant models, labeling the synthetic training image based on the one or more segmented portions of the one or more synthetic plant models includes generating a plant mask, identifying the given synthetic plant model as a whole, based on the corresponding segmented portion of the given synthetic plant model. In some implementations, the method incudes generating a part mask, uniquely identifying the parts of the given synthetic plant model, based on the corresponding segmented portion of the given synthetic plant model. In some versions of those implementations, the method further includes overlaying the plant and part masks on the synthetic training image to label both leaves corresponding to the given synthetic plant and the given synthetic plant as a whole.

In some implementations, the segmented portion of the synthetic plan model uniquely identifies individual leaves of the synthetic plant. In some versions of those implementations, generating the textured portion of the synthetic plant model includes randomly selecting one or more aspects of the synthetic plant model including a number of leaves and a plant height. In some versions of those implementations, for each leaf in the number of leaves, the method further includes randomly selecting a leaf shape, a leaf size, and a leaf texture. In some versions of those implementations, for each leaf in the number of leaves, generating the segmented portion of the synthetic plant model uniquely identifying leaves of the synthetic plant includes annotating the leaf to distinguish the leaf from one or more additional leaves in the number of leaves. In some versions of those implementations, annotating the leaf to distinguish the leaf from the one or more additional leaves in the number of leaves includes identifying one or more pixels associated with the leaf. In some versions of those implementations, the method further includes annotating the one or more pixels associated with the leaf with a unique color.

In some implementations, the method further includes using the synthetic training image to train a machine learning model to segment, in digital images, plants of the same type as at least some of the synthetic plants.

In some implementations, labeling the synthetic training image based on one or more segmented model portions of the one or more synthetic plants includes, for each plant of the one or more synthetic plants, generating a bounding box for the synthetic plant, and generating an additional bounding box for each part of the synthetic plant.

In addition, some implementations include one or more processors (e.g., central processing unit(s) (CPU(s)), graphics processing unit(s) (GPU(s)), and/or tensor processing unit(s) (TPU(s))) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method of generating a labeled synthetic training image, the method implemented by one or more processors and comprising:

generating one or more synthetic plant models, where each synthetic plant model includes (a) a textured portion of the synthetic plant model and (b) a segmented portion of the synthetic plant model uniquely identifying individual parts of the synthetic plant;

generating the synthetic training image based on (a) one or more texture portions of the one or more synthetic plant models and based on (b) a digital image that captures or synthesizes an area; and labeling the synthetic training image based on one or more of the segmented portions of the one or more synthetic plant models.

2. The method of claim 1, wherein labeling the synthetic training image based on the one or more segmented portions of the one or more synthetic plant models comprises:
for each given synthetic plant model, in the one or more synthetic plant models:
generating a plant mask, identifying the given synthetic plant model as a whole, based on the corresponding segmented portion of the given synthetic plant model;
generating a part mask, uniquely identifying the parts of the given synthetic plant model, based on the corresponding segmented portion of the given synthetic plant model.

3. The method of claim 2, further comprising overlaying the plant and part masks on the synthetic training image to label both leaves corresponding to the given synthetic plant and the given synthetic plant as a whole.

4. The method of claim 1, wherein the segmented portion of the synthetic plan model uniquely identifies individual leaves of the synthetic plant.

5. The method of claim 4, wherein generating the textured portion of the synthetic plant model comprises:
randomly selecting one or more aspects of the synthetic plant model including a number of leaves and a plant height; and
for each leaf in the number of leaves, randomly selecting a leaf shape, a leaf size, and a leaf texture.

6. The method of claim 5, wherein generating the segmented portion of the synthetic plant model uniquely identifying leaves of the synthetic plant comprises:
for each leaf in the number of leaves, annotating the leaf to distinguish the leaf from one or more additional leaves in the number of leaves.

7. The method of claim 6, wherein annotating the leaf to distinguish the leaf from the one or more additional leaves in the number of leaves comprises:
identifying one or more pixels associated with the leaf; and
annotating the one or more pixels associated with the leaf with a unique color.

8. The method of claim 1, further comprising:
using the synthetic training image to train a machine learning model to segment, in digital images, plants of the same type as at least some of the synthetic plants.

9. The method of claim 1, wherein labeling the synthetic training image based on one or more segmented model portions of the one or more synthetic plants comprises:
for each plant of the one or more synthetic plants,
generating a bounding box for the synthetic plant; and
generating an additional bounding box for each part of the synthetic plant.

10. At least one non-transitory computer-readable medium for generating a synthetic training image, wherein the medium comprises instructions that, in response to execution of the instructions by one or more processors, cause the one or more processors to:
generate one or more synthetic plant models, where each synthetic plant model includes (a) a textured portion of the synthetic plant model and (b) a segmented portion of the synthetic plant model uniquely identifying individual parts of the synthetic plant;
generate the synthetic training image based on (a) one or more texture portions of the one or more synthetic plant models and based on (b) a digital image that captures or synthesizes an area; and
label the synthetic training image based on one or more of the segmented portions of the one or more synthetic plant models.

11. The at least one non-transitory computer-readable medium of claim 10, wherein instructions to label the synthetic training image based on the one or more segmented portions of the one or more synthetic plant models include:
for each given synthetic plant model, in the one or more synthetic plant models:
generate a plant mask, identifying the given synthetic plant model as a whole, based on the corresponding segmented portion of the given synthetic plant model;
generate a part mask, uniquely identifying the parts of the given synthetic plant model, based on the corresponding segmented portion of the given synthetic plant model.

12. The at least one non-transitory computer-readable medium of claim 11, further comprising instructions to overlay the plant and part masks on the synthetic training image to label both leaves corresponding to the given synthetic plant and the given synthetic plant as a whole.

13. The at least one non-transitory computer-readable medium of claim 10, wherein the segmented portion of the synthetic plan model uniquely identifies individual leaves of the synthetic plant.

14. The at least one non-transitory computer-readable medium of claim 13, wherein instructions to generate the textured portion of the synthetic plant model include:
randomly select one or more aspects of the synthetic plant model including a number of leaves and a plant height; and
for each leaf in the number of leaves, randomly select a leaf shape, a leaf size, and a leaf texture.

15. The at least one non-transitory computer-readable medium of claim 14, wherein instructions to generate the segmented portion of the synthetic plant model uniquely identifying leaves of the synthetic plant include:
for each leaf in the number of leaves, annotate the leaf to distinguish the leaf from one or more additional leaves in the number of leaves.

16. The at least one non-transitory computer-readable medium of claim 15, wherein instructions to annotate the leaf to distinguish the leaf from the one or more additional leaves in the number of leaves include:
identify one or more pixels associated with the leaf; and
annotate the one or more pixels associated with the leaf with a unique color.

17. The at least one non-transitory computer-readable medium of claim 10, wherein the instructions further include:
using the synthetic training image to train a machine learning model to segment, in digital images, plants of the same type as at least some of the synthetic plants.

18. The at least one non-transitory computer-readable medium of claim 10, wherein instructions to label the synthetic training image based on one or more segmented model portions of the one or more synthetic plants comprises:
for each plant of the one or more synthetic plants,
generate a bounding box for the synthetic plant; and
generate an additional bounding box for each part of the synthetic plant.

19. A system for generating a synthetic training image, the system comprising one or more processors and memory storing instructions that, in response to execution of the instructions by the one or more processors, cause the one or more processors to:
- generate one or more synthetic plant models, where each synthetic plant model includes (a) a textured portion of the synthetic plant model and (b) a segmented portion of the synthetic plant model uniquely identifying individual parts of the synthetic plant;
- generate the synthetic training image based on (a) one or more texture portions of the one or more synthetic plant models and based on (b) a digital image that captures or synthesizes an area; and
- label the synthetic training image based on one or more of the segmented portions of the one or more synthetic plant models.

20. The system of claim 19, wherein instructions to label the synthetic training image based on the one or more segmented portions of the one or more synthetic plant models include:
- for each given synthetic plant model, in the one or more synthetic plant models:
  - generate a plant mask, identifying the given synthetic plant model as a whole, based on the corresponding segmented portion of the given synthetic plant model;
  - generate a part mask, uniquely identifying the parts of the given synthetic plant model, based on the corresponding segmented portion of the given synthetic plant model.

* * * * *